३,१०३,५१९
1-BENZOXACYCLOALKANECARBOXYLIC ACIDS
AND ESTERS
Harold Elmer Zaugg, Lake Forest, Robert William De Net, Waukegan, and Raymond John Michaels, Jr., Mundelein, Ill., assignors to Abbott Laboratories, North Chicago, Ill., a corporation of Illinois
No Drawing. Filed June 8, 1961, Ser. No. 115,606
17 Claims. (Cl. 260—333)

This invention is concerned with 1-benzoxacycloalkanes of the formula

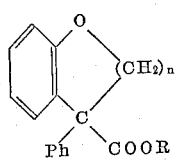

and methods for their preparation. In this and succeeding formula, Ph represents phenyl, n is 1, 2 or 3 and R is hydrogen or loweralkyl of from 1 to 4 carbon atoms, preferably methyl or ethyl. These new compounds are either crystalline solids or colorless liquids. The compounds wherein R is hydrogen are useful as synthetic penicillin intermediates. Thus, when such compounds are converted to the chlorides and reacted with 6-aminopenicillanic acid, the resulting penicillin compounds are active against the penicillin G resistant strain of *Staphylococcus aureus*. The compounds wherein R is loweralkyl are useful as intermediates for the preparation of the compounds wherein R is hydrogen. In addition, the compounds of the present invention wherein R is hydrogen are important intermediates in the preparation of the corresponding amino esters. In such use, the acids are refluxed with thionyl chloride to obtain the carboxylyl chlorides which are thereafter reacted with an amino alcohol, as for example, β-diethylaminoethanol to obtain the corresponding amino esters which are useful as anesthetics and antispasmodics.

In preparing the compounds wherein R is loweralkyl, equimolecular proportions of an alkali metal (preferably sodium or potassium) 3-phenyl-2-benzofuranone and a dihaloalkane of the formula X—(CH₂)ₙ—X wherein each X is chlorine or bromine are reacted alone or in an inert organic solvent such as benzene or dimethylformamide at from about 0° C. to the reflux temperature of the reaction mixture to obtain the intermediate 3-haloalkyl-3-phenyl-2-benzofuranone which if desired is isolated as a crystalline solid in a conventional manner. This intermediate is then reacted with an equimolecular proportion of an alkali metal alkoxide of the formula MOR wherein M is an alkali metal (preferably sodium) at from room temperature to the reflux temperature of the reaction mixture in a suitable solvent, preferably the alkanol from which the alkali metal alkoxide is prepared. The desired esters are thereafter isolated by removing the solvent, treating the residue with water and ether, separating the ether layer, evaporating the ether and distilling or crystallizing the residue. If desired, the compounds wherein R is methyl or ethyl can be prepared without isolating the intermediate by refluxing one molecular proportion each of 3-phenyl-2-benzofuranone and a dihalomethane or dihaloethane with two molecular proportions of an alkali metal alkoxide followed by distillation of the reaction mixture and subsequent crystallization of the distillate from an organic solvent.

The compounds wherein R is hydrogen are readily prepared by the reaction of the foregoing loweralkyl esters or 3-haloalkyl-3-phenyl-2-benzofuranones with an alkali metal hydroxide (preferably sodium hydroxide) in an alcoholic or aqueous medium at from about 23° C. to the reflux temperature of the reaction mixture. When the reaction is complete, the reaction mixture is acidified to precipitate the desired product which is thereafter crystallized from a suitable organic solvent.

The following examples illustrate the invention but are not to be construed as limiting.

EXAMPLE 1

*Step 1.*—To a stirred suspension of 14.4 g. (0.3 mole) of sodium hydride (50% dispersion in mineral oil) in 50 ml. of dry 1,2-dimethoxyethane was added dropwise over a period of one hour, a solution of 63 g. (0.3 mole) 3-phenyl-2-benzofuranone in 175 ml. of 1,2-dimethoxyethane. The temperature rose spontaneously to 65° C. during the addition. After stirring the mixture at room temperature for two hours, 52.2 g. (0.3 mole) of dibromomethane was added in one portion. The solution was then stirred and refluxed for 21 hours. The precipitate of sodium bromide which formed was separated by filtration and the filtrate concentrated to dryness under reduced pressure. The dry residue was recrystallized from ethanol to obtain the intermediate 3-bromomethyl-3-phenyl-2-benzofuranone as a colorless solid melting at 129°–130° C. which upon analysis was found to contain 26.18% bromine compared to the calculated value of 26.36%.

*Step 2.*—To a stirred suspension of 21.2 g. (0.07 mole) of 3-bromomethyl-3-phenyl-2-benzofuranone in 100 ml. of dry methanol was added dropwise at room temperature over a period of 15 minutes, a solution of sodium methoxide previously prepared by adding 1.6 g. of sodium to 50 ml. of dry methanol. After standing overnight, the solvent was removed from the reaction mixture under reduced pressure. The residue was treated with 50 ml. of water and the insoluble layer was taken up in ether and dried over anhydrous magnesium sulfate. Filtration, removal of the ether by evaporation and distillation of the residue gave 12.4 g. (70%) of the desired methyl 3-phenyl-2,3-dihydro-3-benzofurancarboxylate boiling at 147° C. at 1.2 mm. $n_D^{25}$=1.5755; M.P.=48°–49° C.

EXAMPLE 2

The sodium derivative from 21 g. (0.1 mole) of 3-phenyl-2-benzofuranone was prepared as described in Example 1 using 0.11 mole of sodium hydride and 75 ml. of dry dimethylformamide as solvent. The temperature was kept below 45° C. during the reaction. To the stirred solution of the sodium derivative was added 11 g. (0.11 mole) of 1,2-dichloroethane. After stirring for 2 hours at room temperature, the mixture was heated on the steam bath for 16 hours. The reaction mixture was then processed as described in step 1 of Example 1 to obtain the intermediate 3-(β-chloroethyl)-3-phenyl-2-benzofuranone as a crystalline solid which upon recrystallization from ethanol melted at 72°–74° C.

The reaction of equimolecular proportions of the above prepared intermediate with sodium ethoxide in ethanol as described in step 2 of Example 1 resulted in the formation of ethyl 4-phenyl-4-chromancarboxylate which boiled at 175°–178° C. at 2.5 mm.; $n_D^{25}$=1.5730.

EXAMPLE 3

By substituting an equivalent amount of 1,2-dibromoethane for the 1,2-dichloroethane in Example 2, the corresponding 3-(β-bromoethyl)-3-phenyl-2-benzofuranone intermediate was obtained as a crystalline solid which after recrystallization from ethanol melted at 75°–76° C. The reaction of equimolecular proportions of this intermediate and sodium methoxide in dry methanol according to the procedure described in step 2 of Example 1 resulted in the formation of methyl 4-phenyl-4-chromancarboxylate which boiled at 160°–163° C. at 1.4 mm.; $n_D^{26}=1.5833$.

EXAMPLE 4

A solution of the sodium derivative of 3-phenyl-2-benzofuranone (52.5 g., 0.25 mole) in 200 ml. of dimethylformamide prepared as described in Example 1 was cooled in an ice bath and treated with 55 g. (0.27 mole) of 1,3-dibromopropane in one portion. The mixture was stirred at 0°–5° C. for 40 hours and thereafter processed as described in step 1 of Example 1 to obtain the intermediate 3-(γ-bromopropyl)-3-phenyl-2-benzofuranone as a crystalline solid melting at 94°–95° C. Bromine (calcd.)—24.15%. Bromine (found)—23.92%.

To a solution prepared from 25.5 g. (1.1 mole) of sodium and 3 liters of dry methanol was added 267 g. (1.1 moles) of the intermediate prepared above. After stirring at room temperature for one hour, sodium bromide began to precipitate. The mixture was stirred for several hours at room temperature and the solvent then removed by distillation under reduced pressure. Water was added to the solid residue and the mixture was stirred for two hours at room temperature. The desired methyl 5 - phenyl - 2,3,4,5-tetrahydro-1-benzoxepin-5-carboxylate was separated by filtration and after recrystallization from methanol melted at 110°–111° C.

EXAMPLE 5

3-(γ-chloropropyl)-3-phenyl-2-benzofuranone was prepared by alkylation of sodium 3-phenyl-2-benzofuranone with 1-bromo-3-chloropropane in refluxing benzene according to the method of Weston and Brownell, J.A.C.S. 74, 653 (1952). A solution of 14.3 g. (0.05 mole) of this intermediate in 200 ml. of ethanol containing 1.2 g. of sodium was stirred and refluxed for several hours. The solvent was removed under reduced pressure and the residue taken up in a mixture of water and ether. The ether layer was separated, dried over anhydrous magnesium sulfate, the ether removed by distillation and the residue distilled. The fraction boiling at 190°–200° C. at 1.5 mm. was triturated with a cold 10% solution of potassium hydroxide in 95% ethanol. The solid which formed was separated by filtration and recrystallized from ethanol to yield the desired ethyl 5-phenyl-2,3,4,5-tetrahydro-1-benzoxepin-5-carboxylate melting at 100°–101° C.

EXAMPLE 6

By replacing the sodium methoxide in step 2 of Example 1 by an equivalent of sodium ethoxide in ethanol, there was obtained the desired ethyl 3-phenyl-2,3-dihydro-3-benzofurancarboxylate as a crystalline solid melting at 73°–75° C.

EXAMPLE 7

Direct Synthesis of Esters From 3-Phenyl-2-Benzofuranone (a) To a stirred solution of sodium ethoxide prepared from 5.1 g. of sodium in 100 ml. of ethanol was added in one portion a solution of 21 g. (0.1 mole) of 3-phenyl-2-benzofuranone in 100 ml. of ethanol. After refluxing for one hour, the solution was treated with 14.3 g. (0.1 mole) of bromochloromethane in one portion and refluxing with stirring was continued for 18 hours. The desired ethyl 3 - phenyl-2,3-dihydro-3-benzofurancarboxylate was isolated in the usual manner by distillation followed by crystallization. M.P.=73°–75° C.

(b) Ethyl 4-phenyl-4-chromancarboxylate was obtained when either 1,2-dibromoethane or 1-bromo-2-chloroethane was substituted for the bromochloromethane in the above procedure.

(c) Methyl 4-phenyl-4-chromancarboxylate boiling at 171°–176° C. at 2.4 mm. was readily obtained when sodium methoxide in methanol and 1-bromo-2-chloroethane was employed as the alkylating agent in the above described procedure.

EXAMPLE 8

Synthesis of Acids From Esters (a) A solution of 6.2 g. (0.023 mole) of ethyl 3-phenyl-2,3-dihydro-3-benzofurancarboxylate (prepared in Example 6) in 50 ml. of 10% KOH in methanol was refluxed for 20 hours. The methanol was then removed by distillation and replaced by 50 ml. of water. The aqueous solution was acidified with dilute HCl and the oil which formed was taken up in ether and dried over anhydrous magnesium sulfate. Filtration and removal of the ether by distillation gave a residue which solidified when triturated with pentane. After filtering, drying and recrystallizing the solid from benzenehexane, the desired 3-phenyl-2,3-dihydro-3-benzofurancarboxylic acid was obtained in the form of white crystals which melted at 124°–125° C.

(b) 4-phenyl-4-chromancarboxylic acid melting at 151°–152° C. was prepared by hydrolysis and acidification of the corresponding methyl 4-phenyl-4-chromancarboxylate (prepared in Example 3) according to the above procedure.

(c) 5-phenyl - 2,3,4,5 - tetrahydro-1-benzoxepin-5-carboxylic acid melting at 183°–184° C. was obtained by refluxing 62 g. (0.22 mole) of methyl 5-phenyl-2,3,4,5-tetrahydro-1-benzoxepin-5-carboxylate (prepared in Example 4) in 500 ml. of a 10% solution of KOH in 95% ethanol for 16 hours followed by isolation in the usual manner described above.

EXAMPLE 9

Synthesis of Acids From Bromides (a) To a solution of 2 g. (0.05 mole) of NaOH in 30 ml. of water was added 6.1 g. (0.02 mole) of powdered 3-bromomethyl-3-phenyl-2-benzofuranone (prepared in Example 1). The mixture was stirred and heated on the steam bath for 1.5 hours. Treatment of the aqueous solution with HCl precipitated the desired 3-phenyl-2,3-dihydro-3-benzofurancarboxylic acid which after recrystallization from a benzene-hexane mixture melted at 124°–125° C.

(b) 4-phenyl-4-chromancarboxylic acid was obtained by treatment of 6.3 g. (0.02 mole) of 3-(β-bromoethyl)-3-phenyl-2-benzofuranone (prepared in Example 3) with aqueous NaOH and subsequent acidification according to the foregoing procedure. After crystallization from cyclohexane, the product melted at 146°–149° C.

(c) Powdered 3 - (γ-bromopropyl)-3-phenyl-2-benzofuranone (9.9 g., 0.03 mole) prepared as described in Example 4 was stirred at room temperature for two weeks in 200 ml. of water containing 2.4 g. (0.06 mole) of NaOH. Upon acidification of the reaction mixture with normal HCl, an oil precipitated which was isolated by ether extraction and crystallized to obtain the desired 5-phenyl-2,3,4,5-tetrahydro-1-benzoxepin-5-carboxylic acid melting at 181°–183° C.

The 3-phenyl-2-benzofuranone employed as a starting material in the present invention was prepared according to the method described in Ber., 28, 989 (1895).

In a manner similar to that described in Examples 1–6, the compounds wherein R is propyl or butyl in the general formula can be prepared by the reaction of the appropriate 3-phenyl-2-benzofuranone with an alkali metal alkoxide of the formula MOR wherein R is propyl or butyl.

We claim:

1. A compound of the formula

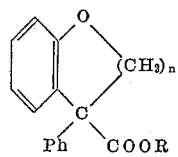

wherein Ph is phenyl, $n$ is a whole number from 1 to 3 inclusive and R is a member of the group consisting of hydrogen and loweralkyl.

2. Methyl 3-phenyl-2,3-dihydro-3-benzofurancarboxylate.
3. Ethyl 4-phenyl-4-chromancarboxylate.
4. Methyl 4-phenyl-4-chromancarboxylate.
5. Methyl 5-phenyl-2,3,4,5-tetrahydro-1-benzoxepin-5-carboxylate.
6. Ethyl 5-phenyl-2,3,4,5-etrahydro-1-benzoxepin-5-carboxylate.
7. Ethyl 5 - phenyl - 2,3 - dihydro - 3 - benzofurancarboxylate.
8. 3-phenyl-2,3-dihydro-3-benzofurancarboxylic acid.
9. 4-phenyl-4-chromancarboxylic acid.
10. 5-phenyl - 2,3,4,5 - tetrahydro-1-benzoxepin-5-carboxylic acid.
11. A method for the preparation of a compound of the formula

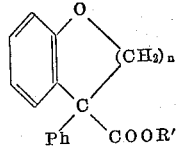

wherein Ph is phenyl, $n$ is a whole number from 1 to 3 inclusive and R' is loweralkyl which comprises reacting equimolecular proportions of an alkali metal 3-phenyl-2-benzofuranone and a dihaloalkane of the formula

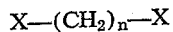

wherein each X is halogen consisting of chlorine and bromine and $n$ is a number as previously defined in an inert organic solvent at from about 0° C. to the reflux temperature of the reaction mixture to obtain the intermediate 3-haloalkyl-3-phenyl-2-benzofuranone which is thereafter reacted with an equivalent amount of an alkali metal alkoxide at from about room temperature to the reflux temperature of the reaction mixture and isolating the resulting product.

12. A method for the preparation of methyl 3-phenyl-2,3-dihydro - 3 - benzofurancarboxylate which comprises refluxing equimolecular proportions of sodium 3-phenyl-2-benzofuranone and dibromomethane in 1,2 - dimethoxyethane and further reacting the intermediate 3-bromomethyl-3-phenyl-2-benzofuranone thus formed with an equivalent amount of sodium methoxide in methanol at room temperature and isolating the resulting product.

13. A method for the preparation of ethyl 4-phenyl-4-chromancarboxylate which comprises heating at about 50° C. equimolecular proportions of sodium 3-phenyl-2-benzofuranone and 1,2-dichloroethane and further reacting the intermediate 3-($\beta$-chloroethyl) - 3 - phenyl-2-benzofuranone thus formed with an equivalent amount of sodium ethoxide in ethanol at room temperature and isolating the resulting product.

14. A method for the preparation of methyl 5-phenyl-2,3,4,5 - tetrahydro - 1 - benzoxepin - 5-carboxylate which comprises reacting equimolecular proportions of sodium 3-phenyl-2-benzofuranone and 1,3-dibromopropane in dimethylformamide at about 0° C. and further reacting the intermediate 3-($\gamma$-bromopropyl)-3-phenyl - 2 - benzofuranone thus formed with an equivalent amount of sodium methoxide in methanol at room temperature and isolating the resulting product.

15. A method for the preparation of 3-phenyl-2,3-dihydro-3-benzofurancarboxylic acid which comprises heating a 3-halomethyl-3-phenyl-2-benzofuranone and an alcoholic solution of an alkali metal hydroxide and thereafter acidifying the reaction mixture.

16. A method for the preparation of 4 - phenyl - 4-chromancarboxylic acid which comprises heating a 3-haloethyl-3-phenyl-2-benzofuranone and an aqueous solution of an alkali metal hydroxide and thereafter acidifying the reaction mixture.

17. A method for the preparation of 5-phenyl-2,3,4,5-tetrahydro-1-benzoxepin - 5 - carboxylic acid which comprises reacting at room temperature a 3-halopropyl-3-phenyl-2-benzofuranone and an aqueous solution of an alkali metal hydroxide and thereafter acidifying the reaction mixture.

References Cited in the file of this patent
UNITED STATES PATENTS
2,855,406  Dann _____ Oct. 7, 1958